(12) United States Patent
Peng et al.

(10) Patent No.: US 10,391,752 B2
(45) Date of Patent: Aug. 27, 2019

(54) FILM STRIPPING DEVICE AND FILM STRIPPING METHOD

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Rui Peng, Beijing (CN); Wenbin Jia, Beijing (CN); Xinxin Wang, Beijing (CN); Zhijie Ye, Beijing (CN); Lei Huang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 48 days.

(21) Appl. No.: 15/505,405

(22) PCT Filed: Aug. 12, 2016

(86) PCT No.: PCT/CN2016/094986
§ 371 (c)(1),
(2) Date: Feb. 21, 2017

(87) PCT Pub. No.: WO2017/118026
PCT Pub. Date: Jul. 13, 2017

(65) Prior Publication Data
US 2018/0117896 A1 May 3, 2018

(30) Foreign Application Priority Data
Jan. 5, 2016 (CN) .......................... 2016 1 0005422

(51) Int. Cl.
*B32B 43/00* (2006.01)
*B32B 38/10* (2006.01)
*H01L 51/56* (2006.01)

(52) U.S. Cl.
CPC ............ *B32B 38/10* (2013.01); *B32B 43/006* (2013.01); *H01L 51/56* (2013.01);
(Continued)

(58) Field of Classification Search
CPC . B32B 38/10; B32B 43/006; Y10T 156/1132; Y10T 156/1944
(Continued)

(56) References Cited

U.S. PATENT DOCUMENTS

2008/0236743 A1   10/2008   Kye et al.
2009/0288760 A1*  11/2009   Garben .................... B41J 29/38
156/230

(Continued)

FOREIGN PATENT DOCUMENTS

CN      2920932 Y     7/2007
CN     101434141 A    5/2009
(Continued)

OTHER PUBLICATIONS

Internationai Search Report and Written Opinion dated Nov. 16, 2016; PCT/CN2016/094986.
(Continued)

*Primary Examiner* — Mark A Osele
*Assistant Examiner* — Nickolas R Harm
(74) *Attorney, Agent, or Firm* — Ladas & Parry LLP (57) ABSTRACT

A film stripping device and a film stripping method are provided. The film stripping device includes a bearing platform and an absorbing member, the bearing platform includes a bearing surface; the bearing surface is configured to bear a plurality of film layers which include a film to be
(Continued)

stripped off; the film to be stripped off is a film in the plurality of film layers away from the bearing surface. The absorbing member is disposed above the bearing platform, includes a plurality of first absorbing holes, and is configured to absorb the film to be stripped off.

12 Claims, 7 Drawing Sheets

(52) U.S. Cl.
CPC ...... *B32B 2457/20* (2013.01); *Y10T 156/1132* (2015.01); *Y10T 156/1944* (2015.01)

(58) Field of Classification Search
USPC ........................................ 156/707, 758, 924
See application file for complete search history.

(56) References Cited

U.S. PATENT DOCUMENTS

| | | | | |
|---|---|---|---|---|
| 2012/0227909 | A1* | 9/2012 | Schindler | H01L 21/67132 156/707 |
| 2013/0241128 | A1 | 9/2013 | Eda et al. | |
| 2014/0290864 | A1* | 10/2014 | Ahn | B32B 43/006 156/379.8 |
| 2016/0016397 | A1* | 1/2016 | Xie | B32B 43/006 156/758 |
| 2016/0031203 | A1* | 2/2016 | Zhao | B32B 43/006 156/715 |
| 2016/0159069 | A1* | 6/2016 | Huang | B32B 43/006 156/707 |
| 2016/0193822 | A1* | 7/2016 | Ni | B32B 43/006 156/715 |

FOREIGN PATENT DOCUMENTS

| | | |
|---|---|---|
| CN | 101889339 A | 11/2010 |
| CN | 103221211 A | 7/2013 |
| CN | 103465267 A | 12/2013 |
| CN | 203561807 U | 4/2014 |
| CN | 203726959 U | 7/2014 |
| CN | 105655487 A | 6/2016 |
| JP | 09-295236 A | 11/1997 |
| JP | 2000-331961 A | 11/2000 |
| JP | 2004-079026 A | 3/2004 |
| JP | 2009-004474 A | 1/2009 |
| JP | 2011-156610 A | 8/2011 |

OTHER PUBLICATIONS

The First Chinese Office Action dated Sep. 28, 2017; Appln. 201610005422.7.
The Second Chinese Office Action dated May 14, 2018; Appln. No. 201610005422.7.

* cited by examiner

FILM STRIPPING DEVICE AND FILM STRIPPING METHOD

TECHNICAL FIELD

At least one embodiment of the present invention relates to a film stripping device and a film stripping method.

BACKGROUND

In the manufacturing process of liquid crystal display (LCD) panels and organic light-emitting diode (OLED) display panels, film stripping devices are usually adopted to strip off films to be stripped off. For example, a film stripping device is adopted to strip off a film to be stripped off so as to expose a film to be used.

SUMMARY

At least one embodiment of the invention provides a film stripping device and a film stripping method. The film stripping device can reduce the use of tape consumables, can solve the problem that the film to be stripped off cannot be gripped and/or the plurality of film layers are gripped simultaneously, and can reduce the cost, reduce the tact time and improve the production efficiency.

At least one embodiment of the invention provides a film stripping device, comprising: a bearing platform, including a bearing surface; the bearing surface being configured to bear a plurality of film layers which include a film to be stripped off; the film to be stripped off being a film in the plurality of film layers away from the bearing surface; and an absorbing member, disposed above the bearing platform, including a plurality of first absorbing holes, and being configured to absorb the film to be stripped off.

For example, in the film stripping device provided by one embodiment of the invention, the bearing surface includes a plurality of second absorbing holes and is configured to absorb a surface of the plurality of film layers away from the film to be stripped off.

For example, in the film stripping device provided by one embodiment of the invention, the absorbing member is an absorbing member capable of rotating on an axis, and capable of absorbing the film to be stripped off and winding the film to be stripped off on a surface of the absorbing member.

For example, in the film stripping device provided by one embodiment of the invention, a gas path is further included, the plurality of first absorbing holes are connected with the gas path; and the gas path is configured to provide negative pressure for the plurality of first absorbing holes.

For example, in the film stripping device provided by one embodiment of the invention, at least two gas paths are included, the plurality of first absorbing holes are divided into at least two groups; each group of first absorbing holes are connected with one gas path; the gas paths are configured to provide negative pressure for each group of first absorbing holes; and the first absorbing holes belonging to one group and the first absorbing holes belonging to the other group are alternately arranged along an axial direction of the absorbing member.

For example, in the film stripping device provided by one embodiment of the invention, the axis of the absorbing member is provided with a hollow inside; and a pipe for forming the gas path is disposed in the hollow inside.

For example, in the film stripping device provided by one embodiment of the invention, the plurality of first absorbing holes are dispersedly distributed on the absorbing member.

For example, in the film stripping device provided by one embodiment of the invention, a surface of the absorbing member includes a buffer layer; and the buffer layer has a material including plastics or rubber.

For example, in the film stripping device provided by one embodiment of the invention, the absorbing member has a shape of a cylinder, an elliptic cylinder or a regular polyhedron.

For example, in the film stripping device provided by one embodiment of the invention, the absorbing member is fixed on a mechanical arm through a longitudinal driving member; the longitudinal driving member is configured to drive the absorbing member to move along a longitudinal direction; the mechanical arm is disposed on a transverse guide rail and connected with a transverse driving member; the transverse driving member is configured to allow the mechanical arm to move along the transverse guide rail; the transverse direction is parallel to the bearing platform; and the longitudinal direction is perpendicular to the bearing platform.

For example, in the film stripping device provided by one embodiment of the invention, the transverse driving member drives the mechanical arm and allows the mechanical arm to drive the longitudinal driving member to move along the transverse direction, and the longitudinal driving member drives the absorbing member to move along the longitudinal direction, so as to strip off a film.

For example, in the film stripping device provided by one embodiment of the invention, the first absorbing holes are extended from an outer surface of the absorbing member capable of rotating on the axis to the inside of the absorbing member.

For example, in the film stripping device provided by one embodiment of the invention, the absorbing member capable of rotating on the axis is a press roll.

At least one embodiment of the invention provides a film stripping method, comprising: allowing a bearing surface of a bearing platform to bear a plurality of film layers, the plurality of film layers including a film to be stripped off, and the film to be stripped off being a film in the plurality of film layers away from the bearing surface; and absorbing the film to be stripped off by vacuum absorption, and allowing the film to be stripped off to be separated from film layers in the plurality of film layers disposed below the film to be stripped off.

For example, in the film stripping method provided by one embodiment of the invention, a surface of the plurality of film layers away from the film to be stripped off is absorbed to the bearing surface of the bearing platform by vacuum absorption; the vacuum absorption force applied to the film to be stripped off is F1; the vacuum absorption force applied to the surface of the plurality of film layers away from the film to be stripped off is F2; and F2 is greater than F1.

For example, in the film stripping method provided by one embodiment of the invention, a vacuum degree for absorbing the film to be stripped off is P1; a vacuum degree for absorbing the surface of the plurality of film layers away from the film to be stripped off is P2; and P2 is greater than P1.

For example, in the film stripping method provided by one embodiment of the invention, the absorbing member is adopted to absorb the film to be stripped off, is an absorbing member capable of rotating on an axis, and is capable of absorbing the film to be stripped off and winding the film to be stripped off on a surface of the absorbing member.

For example, in the film stripping method provided by one embodiment of the invention, before the absorbing member capable of rotating on the axis rolls on the axis for one revolution, a vacuum degree for absorbing the film to be stripped off is kept unchanged, gradually reduced or gradually increased from an initial vacuum degree.

For example, in the film stripping method provided by one embodiment of the invention, after the absorbing member capable of rotating on the axis rolls on the axis for one revolution, the absorbing member capable of rotating on the axis is configured to remove the film to be stripped off from obliquely upwards; and the vacuum degree for absorbing the film to be stripped off is kept unchanged or gradually increased.

For example, in the film stripping method provided by one embodiment of the invention, the absorbing member is driven to strip off the film from obliquely upwards; and an angle between the film which is stripped off and a film which is not stripped off is greater than or equal to 30° C. and less than or equal to 60° C.

For example, in the film stripping method provided by one embodiment of the invention, the absorbing member capable of rotating on the axis is a press roll.

For example, in the film stripping method provided by one embodiment of the invention, the plurality of film layers include a package film for a surface package of an organic light-emitting diode (OLED) display panel.

BRIEF DESCRIPTION OF THE DRAWINGS

Simple description will be given below to the accompanying drawings of the embodiments to provide a more clear understanding of the technical proposals of the embodiments of the present invention. Obviously, the drawings described below only involve some embodiments of the present invention but are not intended to limit the present invention.

FIG. 5a is a schematic diagram of a pipe of a gas path as illustrated in FIG. 4a;

REFERENCE NUMERALS OF THE ACCOMPANYING DRAWINGS

110—bearing platform; 112—bearing surface; 114—driving member; 116—roller; 119—second absorbing hole; 130—transverse guide rail; 140—mechanical arm; 142—longitudinal driving member; 146—transverse driving member; 150—tape; 155—gripping member; 161—first film layer (film to be stripped off); 162—second film layer; 163—third film layer; 170—collecting member; 180—absorbing member; 183—buffer layer; 185—axis; 187—hollow inside; 189—first absorbing hole; 1891—first group of first absorbing holes; 1892—second group of first absorbing holes; 190—gas path; 1921—gas path for the first group of first absorbing holes; 1922—gas path for the second group of first absorbing holes; 190'—pipe of gas path; 1921'—pipe of one gas path; 1922'—pipe of the other gas path.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. Obviously, the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Unless otherwise specified, the technical terms or scientific terms used in the disclosure shall have normal meanings understood by those skilled in the art. The words "first", "second" and the like used in the disclosure do not indicate the sequence, the number or the importance but are only used for distinguishing different components. Similarly, the words "a", "an", "the" and the like also do not indicate the number but only indicate at least one. The word "comprise", "include" or the like only indicates that an element or a component before the word contains elements or components listed after the word and equivalents thereof, not excluding other elements or components. The words "connection", "connected" and the like are not limited to physical or mechanical connection but may include electrical connection, either directly or indirectly. The words "on", "beneath", "left", "right" and the like only indicate the relative position relationship which is correspondingly changed when the absolute position of a described object is changed.

Figure 1A:
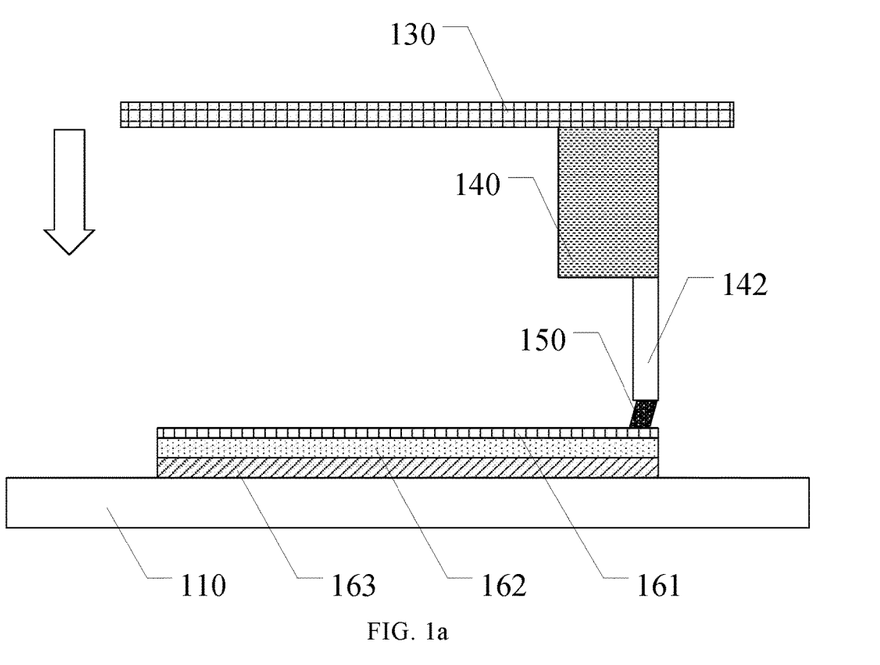
FIG. 1a is a schematic diagram of a general film stripping device in which a tape is adopted to adhere to a film to be stripped off.

For example, in the package technology of large-size OLED display panels, a package protective film is generally adopted to protect a film to be used (a film layer required to be protected). For example, a thermosetting adhesive material used in the surface package process includes three superposed layers (may be as illustrated in FIG. 1a); a first film layer 161 is an adhesive material protective film (a package protective film); a second film layer 162 is a package adhesive film (a film layer required to be protected, a film to be used); and a third film layer 163 is an adhesive material protective film (a package protective film). Thus, when the film to be used is applied, a film stripping device is required for stripping off and removing the package protective films. For example, the film stripping device is adopted to strip off the first film layer 161; subsequently, the second film layer (package adhesive film) 162 is adopted for film package; and after the completion of film package, the film stripping device may also be adopted to strip off the third film layer 163. Generally, the adhesivity between the third film layer 163 and the second film layer 162 is greater than the adhesivity between the first film layer 161 and the second film layer 162. Description is given in the embodiment of the present invention by taking the case of stripping off the first film layer as an example. But the embodiment of the present invention is not limited thereto.

FIG. 1a illustrates a film stripping device, which comprises a bearing platform 110, a transverse guide rail 130, a mechanical arm 140, a longitudinal driving member 142 and a tape 150. The bearing platform 110 is configured to place a plurality of film layers which, for example, include a first film layer 161, a second film layer 162 and a third film layer 163 which are sequentially superposed. The mechanical arm 140 can move along the transverse guide rail 130. The longitudinal driving member 142 is disposed on a lower part of the mechanical arm 140 and can move in the direction perpendicular to a surface of the plurality of film layers. The tape 150 is disposed on the longitudinal driving member 142.

Figure 1B:
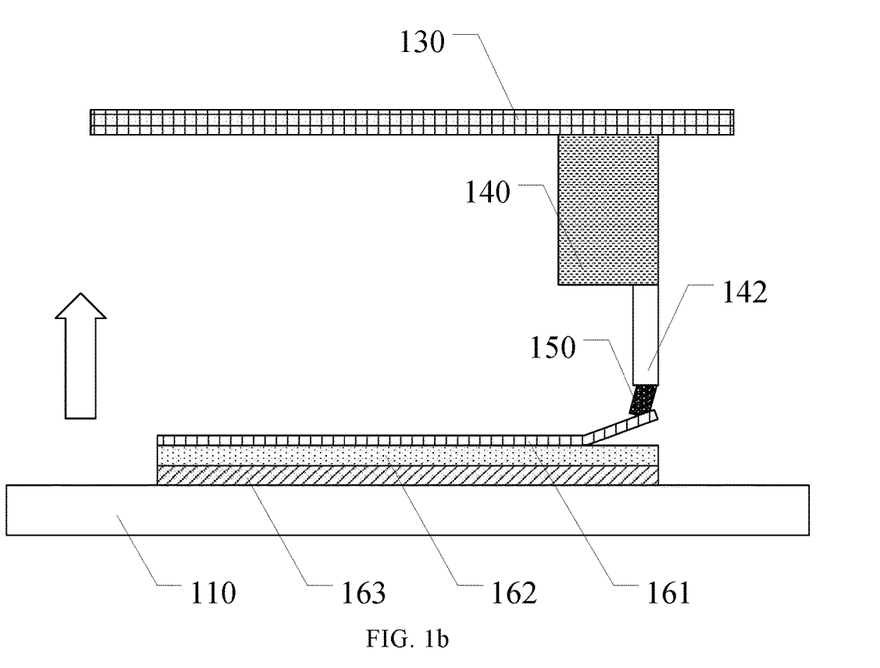
FIG. 1b is a schematic diagram of the general film stripping device in which a film is stripped off by the tape.
Figure 1C:
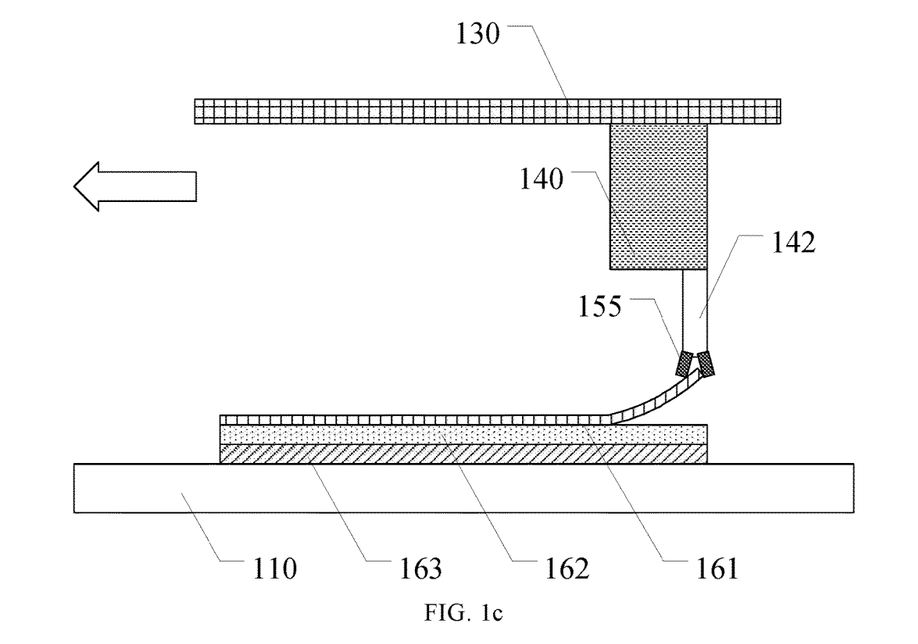
FIG. 1c is a schematic diagram of the general film stripping device in which a gripping member is adopted for film stripping.

FIGS. 1a, 1b and 1c illustrate a general film stripping method. The mechanical arm 140 allows the tape 150 to be adhered to the first film layer 161 through the longitudinal driving member 142, and subsequently, the tape 150 is firmly adhered to the first film layer 161 after roller compaction, as illustrated in FIG. 1a. Subsequently, the mechanical arm 140 drives the tape 150 to move upwards so as to strip off the first film layer 161. FIG. 1b illustrates the case of film stripping via a plurality of tapes 150 in parallel. After the tape 150 is firmly adhered to the first film layer 161, as illustrated in FIG. 1c, a gripping member 155 (for example, the gripping member may be exchanged by rotating the mechanical arm, but the embodiment is not limited thereto) is adopted to grip the first film layer 161 for film stripping, and the first film layer 161 is removed.

The above film stripping method has at least one of the following problems: (1) the plurality of tapes 150 cannot grip the first film layer 161 simultaneously; (2) after roller compression, the first film layer 161, the second film layer 162 and the third film layer 163 are stripped off simultaneously; and (3) consumables of the plurality of tapes 150 are wasted and the tact time is increased.

At least one embodiment of the present invention relates to a film stripping device and a film stripping method. The film stripping device comprises a bearing platform and an absorbing member. The bearing platform includes a bearing surface; the bearing surface is configured to bear a plurality of film layers which include a film to be stripped off; the film to be stripped off is a film in the plurality of film layers away from the bearing surface; and the absorbing member is disposed on the bearing platform, includes a plurality of first absorbing holes, and is configured to absorb the film to be stripped off. The film stripping device can reduce the use of tape consumables, can solve the problem that the film to be stripped off cannot be gripped and/or the plurality of film layers are gripped simultaneously, and can reduce the cost, reduce the tact time and improve the production efficiency.

Description will be given below with reference to several embodiments.

First Embodiment

Figure 2A:
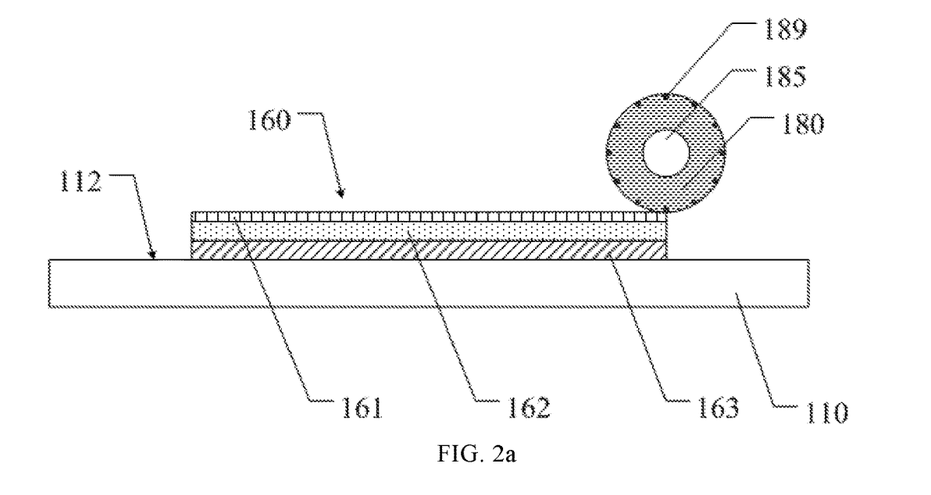
FIG. 2a is a schematic structural view of a film stripping device provided by one embodiment of the present invention and is a schematic diagram illustrating the process of adopting the film stripping device to absorb a film to be stripped off.

The embodiment provides a film stripping device. As illustrated in FIG. 2a, the film stripping device comprises a bearing platform 110 and an absorbing member 180 disposed above the bearing platform 110; the bearing platform 110 includes a bearing surface 112; the bearing surface 112 is configured to bear a plurality of film layers 160 which include a film to be stripped off 161; the film to be stripped off 161 is a film in the plurality of film layers 160 away from the bearing surface 112; and the absorbing member 180 includes a plurality of first absorbing holes 189 and is configured to absorb the film to be stripped off 161.

It should be noted that the absorbing member 180 in the embodiment is configured to absorb the film to be stripped off 161 through the plurality of first absorbing holes 189, and the tape is not required, so that the use of tape consumables can be reduced, and hence the cost, the maintenance time and the tact time can be reduced.

For example, in a film stripping device provided by one example of the embodiment, as illustrated in FIG. 2a, the plurality of film layers 160 include a first film layer 161, a second film layer 162 and a third film layer 163 which are sequentially superposed; and the first film layer 161 is a film to be stripped off and is disposed on one side of the plurality of film layers 160 away from the bearing surface 112. It should be noted that the plurality of film layers 160 includes but not limited to the three film layers. The plurality of film layers 160 may also include two film layers or more than three film layers. No limitation will be given here.

For example, in the film stripping device provided by one example of the embodiment, as illustrated in FIGS. 2a to 2c and FIG. 3, the absorbing member 180 can rotate on an axis 185, and can absorb the film to be stripped off 161 and wind the film to be stripped 161 on a surface of the absorbing member. After the film to be stripped off 161 is wound on the surface of the absorbing member 180, the absorbing member 180 may drive the film to be stripped of 161 for film stripping. The embodiment is not limited thereto.

It should be noted that the absorbing member 180 in the embodiment is configured to wind the film to be stripped off on the surface of the absorbing member, so that the absorption force between the absorbing member 180 and the film to be stripped off 161 can be increased, and hence the objective of firm absorption can be achieved; and the film to be stripped off 161 can be removed without an additional gripping member, so that the structure of the film stripping device can be simplified. Of course, after the film to be stripped off 161 is wound on the surface of the absorbing member 180, the gripping member may be exchanged to grip the film for film stripping. No limitation will be given here.

Figure 2B:
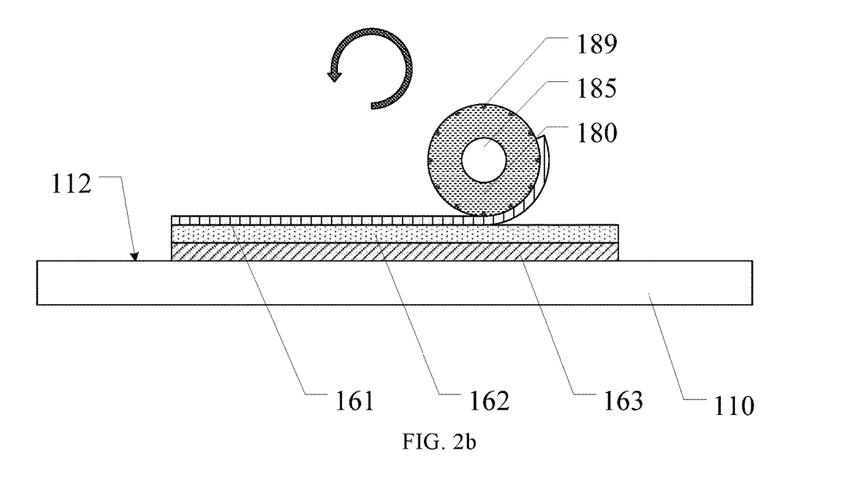
FIG. 2b is a schematic diagram illustrating the process of adopting the film stripping device provided by one embodiment of the present invention for the rolling absorption of the film to be stripped off.
Figure 2C:
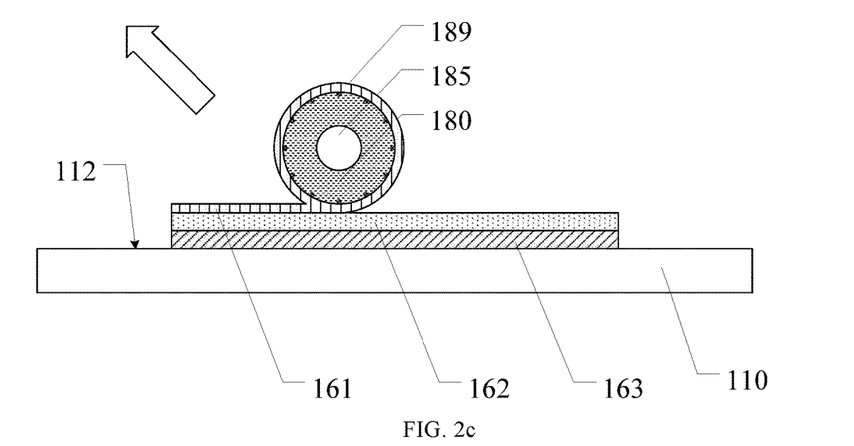
FIG. 2c is a schematic diagram illustrating the process of film stripping via the film stripping device provided by one embodiment of the present invention.

FIGS. 2a to 2c illustrate the process of adopting the film stripping device provided by the embodiment of the present invention for film stripping. Firstly, the absorbing member 180 is close to and tightly adhered to an edge of one side of the film to be stripped off 161, and an absorption force is applied to the film to be stripped off 161 by the absorbing member 180 via vacuum-pumping. Subsequently, the absorbing member 180 is driven to roll towards the other side of the film to be stripped off 161, and the film to be stripped off 161 is wound on the surface of the absorbing member 180 by the absorbing member 180 under the action of the absorption force of the plurality of first absorbing holes 189. Finally, after the absorbing member 180 winds the film to be stripped off 161 for a certain degree, for example, winding for one revolution, the absorbing member 180 is pulled obliquely upwards to strip off and remove the film to be stripped off 161.

Figure 3:
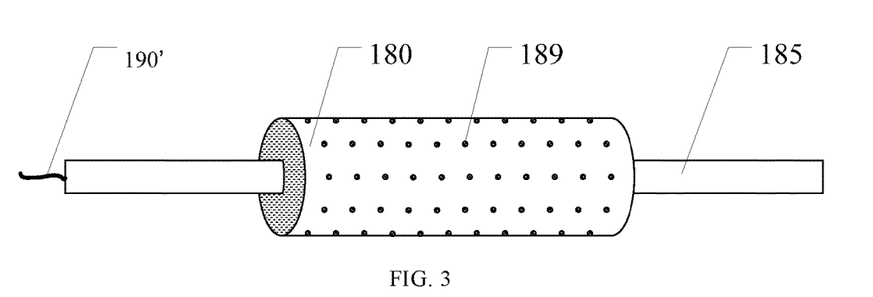
FIG. 3 is a schematic structural view of an absorbing member in the film stripping device provided by one embodiment of the present invention.

For example, in the film stripping device provided by one example of the embodiment, as illustrated in FIG. 3, the plurality of first absorbing holes 189 are dispersedly distributed on the absorbing member 180. It should be noted that the size of the absorbing member 180 and the number of the plurality of first absorbing holes 189 may be adjusted according to the size of the plurality of film layers 160. In addition, the density and the distribution condition of the plurality of first absorbing holes 189 may be adjusted according to the absorption force required to be achieved and the vacuum degree capable of being achieved by a vacuum-pumping device.

For example, in the film stripping device provided by one example of the present invention, as illustrated in FIG. 3, the shape of the absorbing member 180 is a cylinder. It should be noted that the embodiment includes but not limited thereto. For example, the shape of the absorbing member 180 may also an elliptic cylinder, a regular polyhedron or the like. Description is given in the embodiment by taking the case that the absorbing member is a cylinder as an example.

The first absorbing holes 189 in the embodiment may adjust the absorption force thereof by adjusting the vacuum degree in the first absorbing holes. Thus, the absorption force of the absorbing member 180 on the film to be stripped off 161 may be adjusted by adjusting the vacuum degree of the plurality of first absorbing holes 189, so that the problem that the film to be stripped off 161 cannot be gripped can be avoided.

Figure 4A:
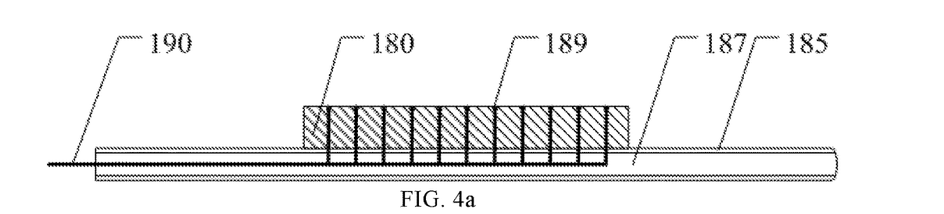
FIG. 4a is a schematic diagram of an upper half section of the first type of absorbing member in the film stripping device provided by one embodiment of the present invention.

For example, the film stripping device provided by one example of the embodiment further comprises a gas path 190. As illustrated in FIG. 4a, the plurality of first absorbing holes 189 of the absorbing member 180 are connected with the gas path 190. The gas path 190 is configured to provide negative pressure for the plurality of first absorbing holes 189. Negative pressure is provided for the plurality of first absorbing holes 189 by the gas path 190, so that the plurality of first absorbing holes 189 can have absorption force.

Figure 4B:
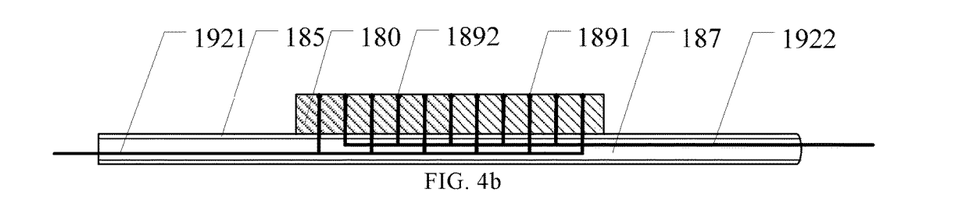
FIG. 4b is a schematic diagram of an upper half section of the second type of absorbing member in the film stripping device provided by one embodiment of the present invention.

For example, a film stripping device provided by another example of the embodiment further comprises at least two gas paths. As illustrated in FIG. 4b, a plurality of first absorbing holes 189 are divided into at least two groups, and each group of first absorbing holes are connected with one gas path. For example, the number of the groups divided by the plurality of first absorbing holes 189 is equal to the number of the gas paths. One gas path 1921 is set for the first group of first absorbing holes 1891, and one gas path 1922 is set for the second group of first absorbing holes 1892. Each gas path is configured to provide negative pressure for one group of the first absorbing holes. The gas path 1921 is configured to provide negative pressure for the first group of first absorbing holes 1891, and the gas path 1922 is configured to provide negative pressure for the second group of first absorbing holes 1892. In the axial direction of the absorbing member 180, the first absorbing holes belonging to one group and the first absorbing holes belonging to the other group are alternately arranged. For example, the first absorbing holes 1891 belonging to the first group and the first absorbing holes 1892 belonging to the second group are alternately arranged. Thus, other groups can still provide negative pressure to absorb the film to be stripped off when the vacuum degree of the first absorbing holes 189 belonging to one group cannot meet the requirement. It should be noted that the plurality of first absorbing holes 189 may be divided into a plurality of groups according to actual demands, not limited to the two groups as described above. For example, three groups, four groups and the like may be divided. No limitation will be given here.

Figure 5A:
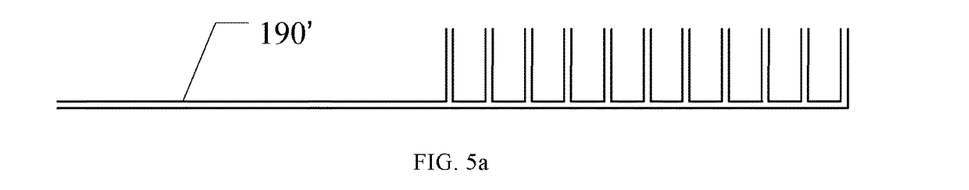
Figure 5B:
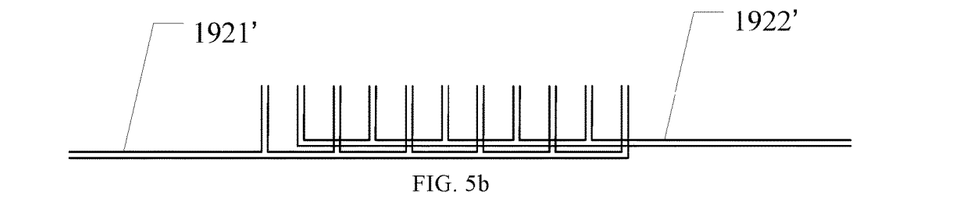
FIG. 5b is a schematic diagram of pipes of gas paths as illustrated in FIG. 4b.

For example, in the film stripping device provided by one example of the embodiment, as illustrated in FIGS. 4a and 4b, the axis 185 of the absorbing member 180 is provided with a hollow inside 187, and pipes which are connected with the plurality of first absorbing holes 189 and configured to form the gas paths (one gas path or at least two gas paths) may be disposed in the hollow inside 187. For example, one pipe is used for forming one gas path. As illustrated in FIGS. 4a and 5a, the hollow inside 187 is provided with a pipe 190' of the gas path 190 connected with the plurality of first absorbing holes 189. As illustrated in FIGS. 4b and 5b, the hollow inside 187 is provided with a pipe 1921' of the gas path 1921 connected with the first group of first absorbing holes 1891 and a pipe 1922' of the gas path 1922 connected with the second group of first absorbing holes 1892. The pipes of the gas paths may be 190' as illustrated in FIGS. 5a and 1921' and 1922' as illustrated in FIG. 5b. It should be noted that the present invention includes but not limited thereto. The pipes of the gas paths may be not disposed in the hollow inside 187 of the axis 185, and channels may be formed at other positions of the absorbing member 180 to arrange the pipes of the gas paths.

For example, in the film stripping device provided by one example of the present invention, as illustrated in FIG. 5a, the first absorbing hole may be extended from an outer surface of the absorbing member to the inside of the absorbing member, and has a length, namely a channel is formed. The embodiment is not limited thereto. The length of the first absorbing hole extended from the outer surface of the absorbing hole to the inside of the absorbing member is not limited in the embodiment, and the absorbing member may be long or short. For example, when the absorbing member is a hollow component, the first absorbing hole may run through the side wall of the absorbing member and extend from the outer surface of the absorbing member to a hollow position. When the first absorbing hole forms the channel, the pipe of the gas path may be at least partially disposed in the first absorbing hole (channel).

For example, the plurality of first absorbing holes 189 may be subjected to vacuum-pumping through the pipes of the gas paths connected with the plurality of first absorbing holes 189, so that an absorption force can be applied to an object close to the plurality of first absorbing holes 189. In addition, gas may be supplied to the plurality of first absorbing holes 189 through the pipe 190' of the gas path, so that an acting force can be applied to the object close to the plurality of first absorbing holes 189. It should be noted that the vacuum degree of the plurality of first absorbing holes 189 produced by vacuum-pumping through the pipe of the gas path may be adjusted according to actual demands.

For example, in the film stripping device provided by one example of the embodiment, one vacuum pump may be adopted for vacuum-pumping in one gas path and is configured to provide negative pressure for the first absorbing holes corresponding to the gas path. When the plurality of first absorbing holes are divided into at least two groups, one vacuum pump may be provided for each group of first absorbing holes, and one vacuum pump may also be provided for the first absorbing holes belonging to different groups. No limitation will be given here.

Figure 6:
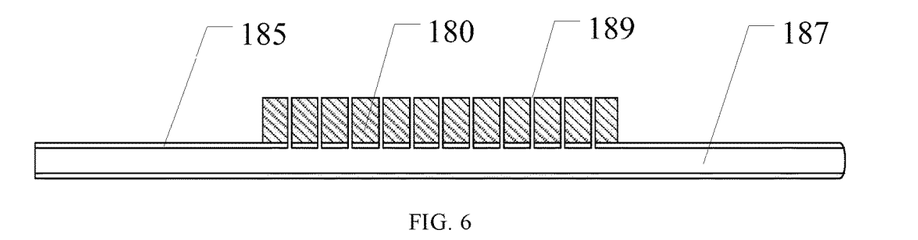
FIG. 6 is a schematic diagram of an upper half section of the third type of absorbing member in one embodiment of the present invention.

For example, in a film stripping device provided by one example of the embodiment, as illustrated in FIG. 6, the hollow inside 187 may form one gas path 190 together with the plurality of first absorbing holes 189, so that no additional pipe of the gas path is required to be disposed in the absorbing member.

In the film stripping device provided by one example of the embodiment, the bearing surface 112 includes a plurality of second absorbing holes 119 configured to absorb a surface in the plurality of film layers 160 away from the film to be stripped off 161. By arrangement of the plurality of second absorbing holes 119, the plurality of film layers 160 may be firmly fixed on the bearing surface 112. Moreover, the vacuum degree of the plurality of second absorbing holes 119 may also be adjusted, so that the absorption force of the plurality of second absorbing holes 119 on the plurality of film layers 160 can be adjusted. When the film stripping device provided by the example is adopted for film stripping, the absorption force of the plurality of second absorbing holes 119 on the plurality of film layers 160 is set to be greater than the absorption force of the plurality of first absorbing holes 189 on the film to be stripped off 161 in the plurality of film layers 160, so that the problem that the first film layer 161, the second film layer 162 and the third film layer 163 in the plurality of film layers 160 are simultaneously stripped off can be avoided, namely the problem that the plurality of film layers are simultaneously gripped can be solved. It should be noted that as similar to the plurality of first absorbing holes 189, gas paths and pipes of the gas paths may also be arranged for the plurality of second absorbing holes 119. The gas paths and the pipes of the gas paths arranged for the plurality of second absorbing holes may refer to the case of the gas paths and the pipes of the gas paths arranged for the plurality of first absorbing holes. No further description will be given here.

Figure 7A:
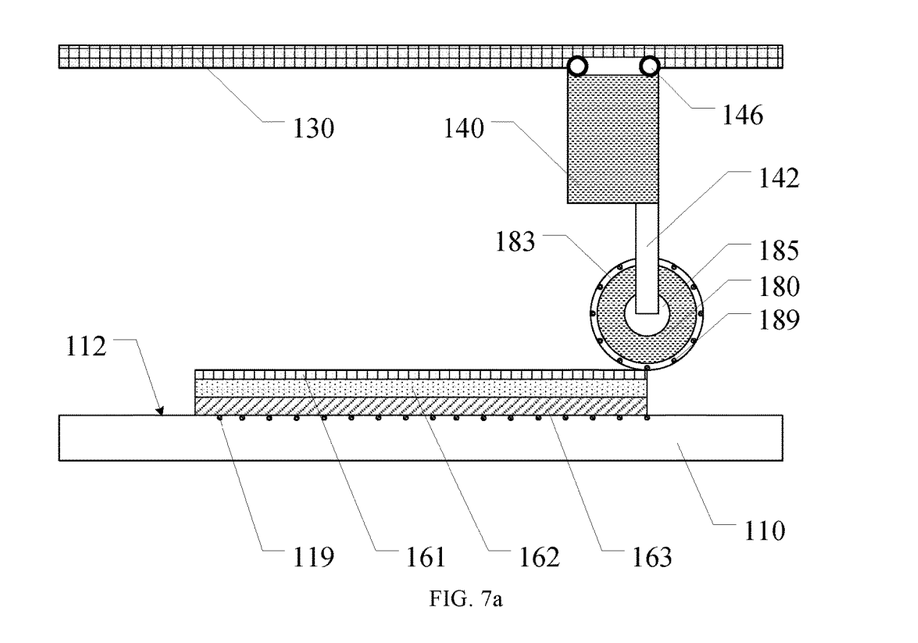
FIG. 7a is a schematic structural view of another film stripping device provided by one embodiment of the present invention and a schematic diagram illustrating the process of absorbing the film stripping device to absorb a film to be stripped off.

For example, in a film stripping device provided by one example of the embodiment, as illustrated in FIG. 7a, a surface of the absorbing member 180 may include a buffer layer 183, and the buffer layer 183 coats the absorbing member 180. The material of the buffer layer 183 may include elastic materials. The elastic materials, for example, include plastics or rubber. It should be noted that by arrangement of the buffer layer 183, when the absorbing member 180 is close to the plurality of film layers 160 and the plurality of film layers 160 are subjected to roller compression via the absorbing member 180, the contact between the absorbing member 180 and the plurality of film layers 160 can be better, and the damage of the plurality of film layers 160 can be avoided. In addition, the embodiment includes but not limited thereto. For example, the buffer layer 183 may also be that flanges corresponding to the first absorbing holes 189 are formed at positions on outer surfaces of the first absorbing holes 189, and the materials of the flanges include elastic materials, so that the damage of the plurality of film layers 160 in the process of contacting the plurality of film layers 160 can be avoided.

For example, in the film stripping device provided by one example of the embodiment, as illustrated in FIG. 7a, the absorbing member 180 is fixed on a mechanical arm 140 through a longitudinal driving member 142; the longitudinal driving member 142 is configured to drive the absorbing member 180 to move along the longitudinal direction; the mechanical arm 140 is disposed on a transverse guide rail 130 and connected with a transverse driving member 146; and the transverse driving member 146 is configured to allow the mechanical arm 140 to move along the transverse guide rail 130. It should be noted that the transverse direction is parallel to the bearing surface 110 and the longitudinal direction is perpendicular to the bearing surface 110. For example, the absorbing member 180 may be connected with the longitudinal driving member 142 through a bearing disposed on an axis 185, but the embodiment is not limited thereto. For example, the axis 185 may be driven by a gear, a belt, a motor or the like, but the embodiment is not limited thereto.

Figure 7B:
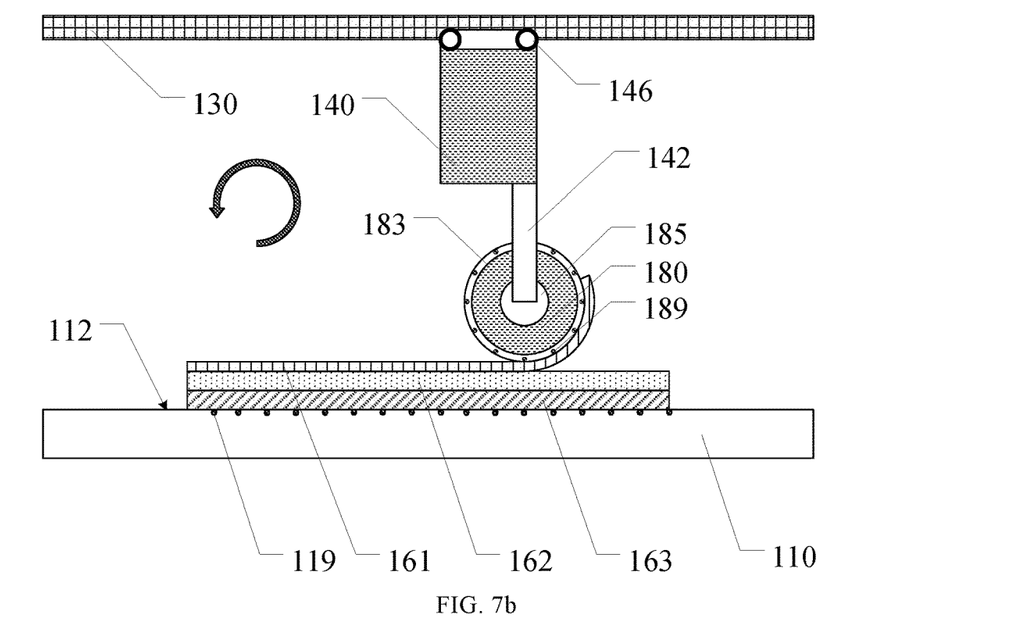
FIG. 7b is a schematic structural view of a film stripping device provided by one embodiment of the present invention and a schematic diagram illustrating the rolling absorption of a film to be stripped off.
Figure 7C:
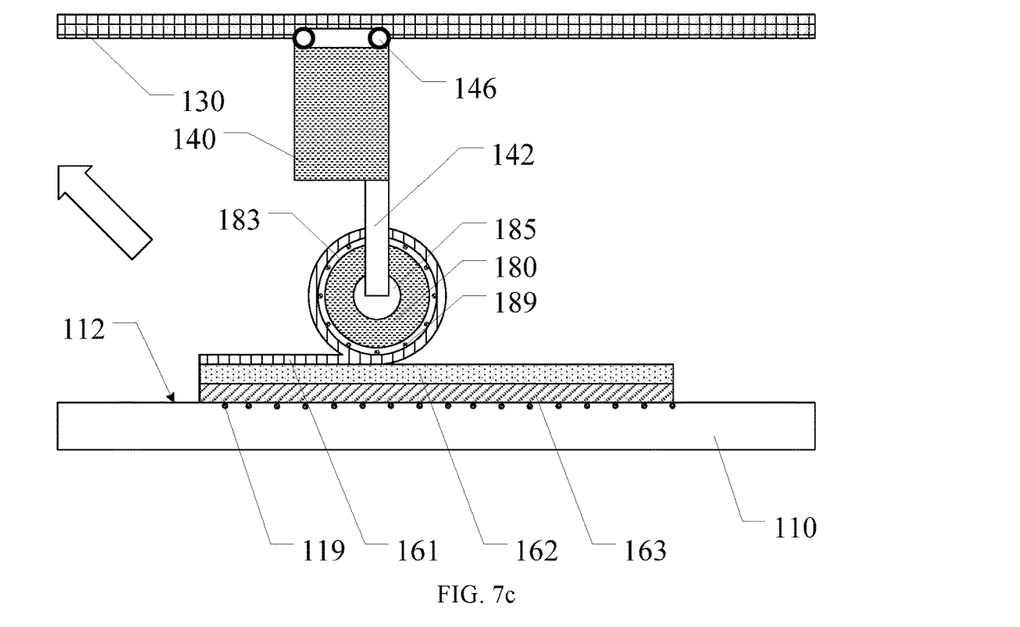
FIG. 7c is a schematic structural view of a film stripping device provided by one embodiment of the present invention and a schematic diagram illustrating the process of adopting the film stripping device for film stripping.

For example, in the film stripping device provided by one example of the embodiment, as illustrated in FIGS. 7a, 7b and 7c, the transverse driving member 146 may drive the mechanical arm 140 and allow the mechanical arm 140 to drive the longitudinal driving member 142 to move along the transverse direction, so that the absorbing member 180 fixed on the longitudinal driving member 142 can be driven to move to a specified position in the transverse direction. Moreover, the longitudinal driving member 142 may drive the absorbing member 180 to move along the longitudinal direction, so that the film stripping action along certain direction can be performed.

For example, in the film stripping device provided by one example of the present invention, the longitudinal driving member 142 includes but not limited to at least one of a cylinder, a motor, a belt, a gear or a screw, and the transverse driving member 146 includes but not limited to at least one of the cylinder, the motor, the belt, the gear or the screw.

Figure 8:
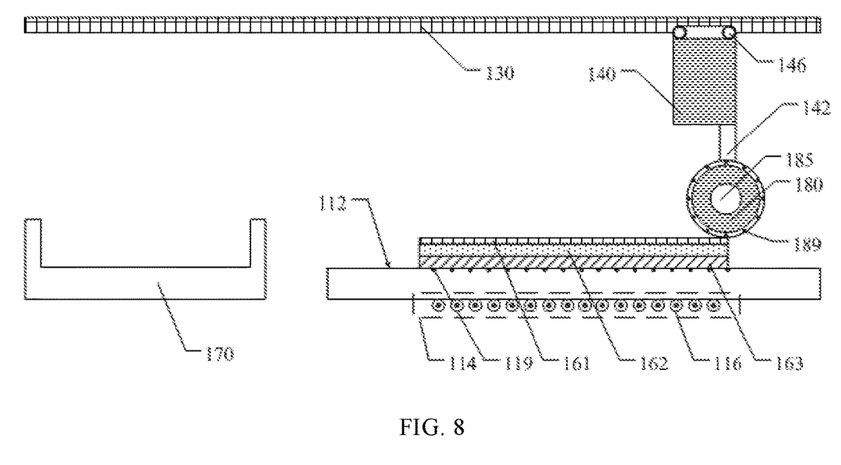
FIG. 8 is a schematic structural view of another film stripping device provided by one embodiment of the present invention.

For example, in a film stripping device provided by one example of the present invention, as illustrated in FIG. 8, the bearing platform 110 is equipped with a driving member 114 to drive the plurality of film layers 160 to move, and the driving member 114 includes a plurality of rollers 116 capable of rotating on axes. As illustrated in FIG. 8, the driving member 114 disposed beneath the bearing platform 110 can drive the bearing platform 110 to move along the transverse direction, not only allows the plurality of film layers 160 and the mechanical arm 140 to move towards opposite directions and hence improves the film stripping efficiency, but also sequentially conveys the plurality of film layers 160 to a film stripping area for continuous operation. It should be noted that the film stripping area is an area at which the absorbing member 180 can operate.

For example, as illustrated in FIG. 8, the film stripping device provided by one example of the embodiment may further comprise a collecting member 170 which is configured to collect the film to be stripped off 161 removed by the absorbing member 180. After the film to be stripped off 161 is stripped off and removed, the absorbing member 180 continuously moves along the transverse direction to the upper part of the collecting member 170 when driven by the transverse driving member 146 and/or the longitudinal driving member 142; and the vacuum-pumping of the plurality of first absorbing holes 189 is ceased or positive pressure (gas supply) is provided for the plurality of first absorbing holes 189, so that the film to be stripped off 161 can be disengaged from the absorbing member 180 and fall into the collecting member 170. The film to be stripped off 161 may be recovered by the arrangement of the collecting member 170. In addition, as the film stripping device provided by the example adopts vacuum negative pressure to absorb the film to be stripped off 161 and the buffer layer 183 is arranged, no viscous substance is adhered to the film to be stripped off 161 or no damage is produced, so that recycling can be achieved.

For example, in the film stripping device provided by one example of the embodiment, the absorbing member 180 capable of rotating on the axis 185 may be a press roll (roller wheel).

Second Embodiment

The embodiment provides a film stripping method. As illustrated in FIGS. 2a to 2c, the method comprises: allowing a bearing surface 112 of a bearing platform 110 to bear a plurality of film layers 160, in which the plurality of film layers 160 include a film to be stripped off 161, and the film to be stripped off 161 is a film in the plurality of film layers 160 away from the bearing surface 112; and absorbing the film to be stripped off 161 by vacuum absorption, and separating the film to be stripped off 161 from film layers in the plurality of film layers 160 disposed below the film to be stripped off 161.

The film stripping method provided by the embodiment adopts vacuum absorption for film stripping, does not require viscous substances such as tapes, can reduce the use of tape consumables, and hence can reduce the cost. In addition, as the vacuum absorption means can control the absorption force by adjusting the vacuum degree, the absorption force can be adjusted according to the adhesivity between different films to be stripped off 161 and the film layers in the plurality of film layers 160 disposed below the film to be stripped off 161, so that the problem that the film to be stripped off 161 cannot be stripped off can be avoided.

For example, in the film stripping method provided by one example of the embodiment, a surface in the plurality of film layers 160 away from the film to be stripped off 161 is absorbed to the bearing surface 112 of the bearing platform 110; the vacuum absorption force applied to the film to be stripped off 161 is F1; the vacuum absorption force applied to the surface in the plurality of film layers 160 away from the film to be stripped off 161 is F2; and F2 is greater than F1. As F2 is set to be greater than F1, when the film stripping method provided by the example is adopted for film stripping, the problem that the film layers in the plurality of film layers 160 are simultaneously stripped off can be avoided.

For example, in the film stripping method provided by one example of the embodiment, the vacuum absorption force F1 applied to the film to be stripped off 161 and the vacuum absorption force F2 applied to the surface in the plurality of film layers 160 away from the film to be stripped off 161 have the same active area. Thus, the vacuum degree of absorbing the film to be stripped off 161 is P1; the vacuum degree of absorbing the surface in the plurality of film layers 160 away from the film to be stripped off 161 is P2; and P2 is greater than P1, namely the absolute value of P2 is greater than the absolute value of P1. For example, the difference between the absolute value of P2 and the absolute value of P1 is greater than or equal to 8 kPa. Moreover, for example, the difference is greater than or equal to 10 kPa. The embodiment is not limited thereto. For example, in one example, P1 is −80 kPa and P2 is −90 kPa. It should be noted that the values of P1 and P2 are not limited to the example. Due to the difference of the vacuum degree (pressure difference), the surface in the plurality of film layers 160 away from the film to be stripped off 161 can be firmly absorbed to the surface of the bearing platform. For example, in the film stripping method provided by one example of the embodiment, as illustrated in FIGS. 2a to 2c, the absorbing member 180 is adopted to absorb the film to be stripped off 161, is an absorbing member capable of rotating on an axis, and can absorb the film to be stripped off 161 and wind the film to be stripped off 161 on a surface of the absorbing member. The objective of firm absorption can be achieved by winding the film to be stripped off 161 on the surface of the absorbing member 180; no additional gripping member is required; and the film to be stripped off 161 cannot fall off in the film stripping process in the subsequent process of removing the film to be stripped off 161.

For example, in the film stripping method provided by one example of the embodiment, as illustrated in FIGS. 3, 4a and 4b, the plurality of first absorbing holes 189 are at least disposed on an outer surface of the absorbing member 180. The settings of the first absorbing holes may refer to the description in the previous embodiments. No further description will be given here. The axis 185 of the absorbing member 180 is provided with a run-through hollow inside 187, and a pipe of a gas path connected with the plurality of first absorbing holes 189 is disposed in the hollow inside 87. The gas path and the pipe of the gas path may refer to the description in the previous embodiments. No further description will be given here.

As described in the first embodiment, the film to be stripped off 161 is absorbed by the arrangement of the absorbing member 180 and the first absorbing holes 189. For example, as described in the first embodiment, the surface in the plurality of film layers 160 away from the film to be stripped off 161 is absorbed to the bearing surface 112 of the bearing platform by the arrangement of the second absorbing holes 119. For example, the first absorbing holes 189 and the second absorbing holes 119 have equal size and have the same linear density along the direction of the axis of the absorbing member. The linear density, for example, refers to the number of the first absorbing holes or the second absorbing holes per unit length.

For example, in the film stripping method provided by one example of the embodiment, as illustrated in FIGS. 2a to 2c, before the absorbing member 180 capable of rotating on the axis rolls on the axis for one revolution, the vacuum degree of absorbing the film to be stripped off 161 is kept unchanged, gradually reduced or gradually increased from the initial vacuum degree. But no matter how the vacuum degree of absorbing the film to be stripped off 161 changes, P2 shall be greater than P1.

For example, in the film stripping method provided by one example of the embodiment, as illustrated in FIGS. 2a to 2c, after the absorbing member 180 capable of rotating on the axis rolls on the axis for one revolution, the absorbing member 180 capable of rotating on the axis is configured to remove the film to be stripped off 161 from obliquely upwards, and the vacuum degree of absorbing the film to be stripped off 161 is kept unchanged or gradually increased. Thus, the surface in the plurality of film layers 160 away from the film to be stripped off 161 can be firmly absorbed to the surface of the bearing platform. Moreover, the process of removing the film to be stripped off 161 from obliquely upwards can avoid the influence of the absorbing member 180 on the film layers below the film to be stripped off 161 and avoid the damage of the film layers below the film to be stripped off 161. Obliquely upwards, for example, refers to the direction in which the included angle between the direction and the surface of the plurality of film layers is greater than or equal to 30° C. and less than or equal to 60° C., but the embodiment is not limited thereto.

For example, in the film stripping method provided by one example of the embodiment, as illustrated in FIGS. 2a to 2c, the absorbing member 180 is driven to strip off a film from obliquely upwards, and the included angle between a film which is stripped off and a film which is not stripped off may be greater than or equal to 30° C. and less than or equal to 60° C. But the embodiment is not limited thereto. For example, the included angle may be 45° C. In this case, the film stripping process of the film to be stripped off can be more easily performed. For example, the included angle between the film which is stripped off and the film which is not stripped off is within the above range by adjusting the transverse driving member and the longitudinal driving member.

For example, in the film stripping method provided by one example of the embodiment, the absorbing member 180 capable of rotating on the axis is a press roll.

For example, in the film stripping method provided by one example of the embodiment, the plurality of film layers 160 include a package film for the surface package of an OLED display panel. But the embodiment is not limited thereto.

For example, the film stripping method provided by one example of the embodiment may adopt any film stripping device in the first embodiment for film stripping.

It should be noted that:

(1) The accompanying drawings of the embodiments of the present invention only give schematic illustration on the structures involved in the embodiments of the present invention, and other structures may refer to general design on the basis of the present invention.

(2) For clarity, in the accompanying drawings of the embodiments of the present invention, the thickness of layers or areas is enlarged. It should be understood that when an element such as a layer, a film, an area and a substrate is referred to be disposed "above" or "below" another element, the element may be "directly" disposed "on" or "beneath" another element, or an intermediate element may be provided.

(3) The characteristics in different embodiments and the same embodiment of the present invention may be mutually combined in the absence of conflict.

The foregoing is only the preferred embodiments of the present invention and not intended to limit the scope of protection of the present invention. Any change or replacement that may be easily thought of by those skilled in the art within the technical scope disclosed by the present invention shall fall within the scope of protection of the present invention. Therefore, the scope of protection of the present invention shall be defined by the appended claims.

The application claims priority to the Chinese patent application No. 201610005422.7, filed Jan. 5, 2016, the disclosure of which is incorporated herein by reference as part of the application.

The invention claimed is:

1. A film stripping device, comprising:
a bearing platform, including a bearing surface; the bearing surface being configured to bear a plurality of film layers which include a film to be stripped off; the film to be stripped off being a film in the plurality of film layers away from the bearing surface;
an absorbing member, disposed above the bearing platform, including a plurality of first absorbing holes, and being configured to absorb the film to be stripped off, wherein the absorbing member is an absorbing member capable of rotating on an axis; and
at least two gas paths,
wherein the plurality of first absorbing holes are divided into at least two groups; each group of first absorbing holes are connected with one gas path; the gas paths are configured to provide negative pressure for each group of first absorbing holes; and the first absorbing holes belonging to one group and the first absorbing holes belonging to the other group are alternately arranged along an axial direction of the absorbing member.

2. The film stripping device according to claim 1, wherein the bearing surface includes a plurality of second absorbing holes and is configured to absorb a surface of the plurality of film layers away from the film to be stripped off.

3. The film stripping device according to claim 1, wherein the absorbing member is capable of absorbing the film to be stripped off and winding the film to be stripped off on a surface of the absorbing member.

4. The film stripping device according to claim 3, wherein the first absorbing holes are extended from an outer surface of the absorbing member capable of rotating on the axis to the inside of the absorbing member.

5. The film stripping device according to claim 3, wherein the absorbing member capable of rotating on the axis is a press roll.

6. The film stripping device according to claim 1, wherein the axis of the absorbing member is provided with a hollow inside; and a pipe for forming the gas path is disposed in the hollow inside.

7. The film stripping device according to claim 1, wherein the plurality of first absorbing holes are dispersedly distributed on the absorbing member.

8. The film stripping device according to claim 1, wherein a surface of the absorbing member includes a buffer layer; and the buffer layer has a material including plastics or rubber.

9. The film stripping device according to claim 1, wherein the absorbing member has a shape of a cylinder, an elliptic cylinder or a regular polyhedron.

10. The film stripping device according to claim 1, wherein the absorbing member is fixed on a mechanical arm through a longitudinal driving member; the longitudinal driving member is configured to drive the absorbing member to move along a longitudinal direction; the mechanical arm is disposed on a transverse guide rail and connected with a transverse driving member; the transverse driving member is configured to allow the mechanical arm to move along the transverse guide rail; the transverse direction is parallel to the bearing platform; and the longitudinal direction is perpendicular to the bearing platform.

11. The film stripping device according to claim 10, wherein the transverse driving member drives the mechanical arm and allows the mechanical arm to drive the longitudinal driving member to move along the transverse direction, and the longitudinal driving member drives the absorbing member to move along the longitudinal direction, so as to strip off a film.

12. A film stripping device, comprising:
a bearing platform, including a bearing surface; the bearing surface being configured to bear a plurality of film layers which include a film to be stripped off; the film to be stripped off being a film in the plurality of film layers away from the bearing surface; and an absorbing member, disposed above the bearing platform, including a plurality of first absorbing holes, and being configured to absorb the film to be stripped off, wherein the absorbing member is fixed on a mechanical arm through a longitudinal driving member; the longitudinal driving member is configured to drive the absorbing member to move along a longitudinal direction; the mechanical arm is disposed on a transverse guide rail and connected with a transverse driving member; the transverse driving member is configured to allow the mechanical arm to move along the transverse guide rail; the transverse direction is parallel to the bearing platform; and the longitudinal direction is perpendicular to the bearing platform; the transverse driving member drives the mechanical arm and allows the mechanical arm to drive the longitudinal driving member to move along the transverse direction, and the longitudinal driving member drives the absorbing member to move along the longitudinal direction, so as to strip off a film.

* * * * *